UNITED STATES PATENT OFFICE.

ALEXANDER S. RAMAGE, OF BUFFALO, NEW YORK, ASSIGNOR TO INTERNATIONAL COLOR & CHEMICAL COMPANY, INCORPORATED, OF DETROIT, MICHIGAN, A CORPORATION OF NEW YORK.

PROCESS OF PREPARING CHROMATES OF LEAD.

1,168,417.     Specification of Letters Patent.     Patented Jan. 18, 1916.

No Drawing.     Application filed April 16, 1915. Serial No. 21,872.

*To all whom it may concern:*

Be it known that I, ALEXANDER S. RAMAGE, a subject of the King of Great Britain, residing at Buffalo, in the county of Erie and State of New York, have invented certain new and useful Improvements in Processes of Preparing Chromates of Lead, of which the following is a specification.

The object of this invention is the provision of a simple and highly economical process of preparing chromates of lead or chrome-yellow pigments. As is well known, these pigments possess excellent covering, lasting and inhibitive properties, but as heretofore prepared, they have been too expensive to permit their universal use.

In the preparation of chrome yellows according to the present invention, I may start either from pig lead or lead dross, or directly from the sulfid ores of lead. Irrespective of the starting material, the first step consists in forming a pure sulfate of lead, which is thereafter converted into the chromate. Or instead of preparing sulfate of lead by the methods hereinafter described, I may start directly with sulfate of lead prepared by other methods or derived from other sources.

When pig lead or equivalent form of the metal is used as the starting material, it is melted, granulated or feathered in water, and dissolved in diluted nitric or acetic acid. The resulting lead nitrate or acetate is run into wooden tanks and precipitated by the molecular equivalent of sulfuric acid. The nitric or acetic acid is thus set free without material dilution, and may be directly utilized for dissolving further quantities of lead.

The lead sulfate pulp from which the acid has been decanted is run into a wooden filter tank provided with a false bottom covered with asbestos cloth, and fitted, below the false bottom, with vacuum and water-inlet connections. The sulfate is drained as thoroughly as possible, preferably with the aid of the vacuum, and water is then introduced very slowly from below, whereby the remaining acid is displaced upwardly and collected at the overflow. By proceeding in this way, the losses of acid are minimized, and it has been found practicable to reduce them to approximately one per cent. of the total quantity of acid used at each operation.

The thoroughly washed and pure white sulfate of lead, while still in a moist condition, is charged with water into a wooden tank, together with a sufficient proportion of sodium bicromate, and the whole is thoroughly boiled; thereafter, a suitable quantity of caustic soda is added, and the boiling is continued until the conversion of the lead into the chromate is complete. The whole operation may be finished in about one hour, and the resulting chromate of lead, after careful washing and draining, is pulped with about twenty per cent. of its weight of oil, this pulping process being carried out in the same manner as is commonly practised in the case of white lead pigments. Inasmuch as the several lead precipitates have at no time been permitted to become dry, the resulting suspension in oil is exceedingly perfect and almost colloidal in character.

Suitable proportions of reagents for the conversion of lead sulfate to chromate are about 246 parts by weight of sodium bichromate, and about 200 parts by weight of caustic soda, to each 1000 parts of lead sulfate; but these proportions may be varied according to the shade of yellow desired in the product.

It will be observed that according to the above description the lead sulfate is boiled in presence of the sodium bichromate before the caustic soda is added. If this procedure is not followed, or if the sodium bichromate and caustic soda are introduced simultaneously, an objectionably flocculent precipitate will be produced. For example, the successive introduction of the bichromate and soda in the order named yields a pulp or paste weighing about sixteen pounds per gallon, whereas if these components are added simultaneously, a paste weighing but twelve pounds per gallon will result.

Lead dross may be treated in the same manner as metallic lead.

As above stated, the source or mode of production of the lead sulfate is not material to that portion of my invention which pertains to the conversion of the lead sulfate to the chromate; and the sulfate may therefore be prepared directly from sulfid ores or from other lead-bearing materials, following any of the recognized methods. I prefer however to prepare the sulfate directly from the sulfid ores of lead in accordance with the procedure described and claimed in my copending application Serial No. 21,873, filed April 16, 1915.

The expression "a chromate of lead" is employed herein to include the basic chromates of lead.

I claim:—

1. A cyclical process of making a chromate of lead, which consists in dissolving a lead-bearing material in an acid, precipitating the lead as sulfate and setting free the solvent acid by addition of sulfuric acid, washing the precipitated sulfate and digesting the same in presence of an alkali metal chromate, then adding an alkaline reagent, and applying the liberated solvent acid to fresh portions of the lead-bearing material.

2. A cyclical process of making a chromate of lead, which consists in dissolving a lead-bearing material in an acid, precipitating the lead as sulfate and setting free the solvent acid by addition of sulfuric acid, washing the precipitated sulfate and digesting the same in presence of sodium bichromate, then adding caustic soda, and applying the liberated solvent acid to fresh portions of the lead-bearing material.

3. In a process of producing a chromate of lead, the step which consists in digesting lead sulfate in presence of a bichromate, and then adding an alkali, thereby converting the sulfate of lead into a chromate.

4. In a process of producing a chromate of lead, the step which consists in digesting lead sulfate in presence of a bichromate, then adding a caustic alkali, and continuing the digestion to convert the sulfate of lead into a chromate.

In testimony whereof I affix my signature.

ALEXANDER S. RAMAGE.